US010766551B2

(12) United States Patent
Lee et al.

(10) Patent No.: US 10,766,551 B2
(45) Date of Patent: Sep. 8, 2020

(54) AUTO MOUNTING SYSTEM OF DOOR HINGE FOR VEHICLE AND METHOD THEREOF

(71) Applicants: Kia Motors Corporation, Seoul (KR); Hyundai Motor Company, Seoul (KR)

(72) Inventors: Jun Hee Lee, Gunpo-si (KR); Dae Won Lee, Gunpo-si (KR)

(73) Assignees: Kia Motors Corporation, Seoul (KR); Hyundai Motor Company, Seoul (KR)

( * ) Notice: Subject to any disclaimer, the term of this patent is extended or adjusted under 35 U.S.C. 154(b) by 1 day.

(21) Appl. No.: 16/182,326

(22) Filed: Nov. 6, 2018

(65) Prior Publication Data

US 2019/0071142 A1    Mar. 7, 2019

Related U.S. Application Data

(62) Division of application No. 14/494,307, filed on Sep. 23, 2014, now Pat. No. 10,155,555.

(30) Foreign Application Priority Data

Sep. 24, 2013  (KR) ........................ 10-2013-0113121

(51) Int. Cl.
  *B62D 65/06*    (2006.01)
(52) U.S. Cl.
  CPC ......... *B62D 65/06* (2013.01); *Y10T 29/49947* (2015.01); *Y10T 29/53* (2015.01); *Y10T 29/53978* (2015.01)
(58) Field of Classification Search
  CPC .... B62D 65/024; B62D 65/06; B62D 65/022; B62D 65/02; Y10T 29/53978; Y10T 29/53; Y10T 29/53313; Y10T 29/53365; Y10T 29/53383; Y10T 29/534; Y10T 29/49622; Y10T 29/24
  See application file for complete search history.

(56) References Cited

U.S. PATENT DOCUMENTS 3,470,599 A * 10/1969 Burman ................. B21D 51/52
                                                       29/710
3,537,166 A * 11/1970 Matyas ............... E05D 11/0009
                                                       29/281.5
3,772,757 A * 11/1973 Goldstein ............... B23P 19/06
                                                       29/719

(Continued)

FOREIGN PATENT DOCUMENTS

JP         2917376 B2     4/1999
JP       2006-206016 A    8/2006
            (Continued)

*Primary Examiner* — Christopher M Koehler
(74) *Attorney, Agent, or Firm* — Morgan, Lewis & Bockius LLP

(57) ABSTRACT

The present disclosure relates to an auto mounting system of a door hinge for a vehicle and a method thereof, and more particularly, to an auto mounting system of a door hinge for the vehicle and a method thereof capable of automatically mounting the door hinges on side panels of the vehicle using an auto mounting apparatus of a door hinge to automatically mount the door hinges for front and rear doors on the side panels of the vehicle, thereby improving operation convenience due to the minimization of the number of workers, assembling quality, operating ratio.

2 Claims, 9 Drawing Sheets

(56) References Cited

U.S. PATENT DOCUMENTS

| | | | | |
|---|---|---|---|---|
| 4,375,716 A | * | 3/1983 | Armstrong | B62D 65/06 29/404 |
| 5,181,307 A | * | 1/1993 | Kitahama | B62D 65/06 29/11 |
| 5,203,073 A | * | 4/1993 | Kotake | B62D 65/02 29/771 |
| 6,122,813 A | * | 9/2000 | Roy | B62D 65/06 29/281.1 |
| 6,209,186 B1 | * | 4/2001 | Hui | B25B 27/0035 29/271 |
| 6,311,382 B1 | * | 11/2001 | Jack | B62D 65/06 269/905 |
| 2004/0034984 A1 | * | 2/2004 | Aoki | B62D 25/04 29/525.01 |
| 2007/0170198 A1 | * | 7/2007 | Kvalheim | G07F 11/04 221/92 |
| 2009/0265888 A1 | * | 10/2009 | Lee | B62D 65/06 16/252 |

FOREIGN PATENT DOCUMENTS

| | | |
|---|---|---|
| JP | 2009-40345 A | 2/2009 |
| KR | 10-2003-0023004 A | 3/2003 |
| KR | 10-2006-0010969 A | 2/2006 |
| KR | 10-2007-0014303 A | 2/2007 |
| KR | 10-0916466 B1 | 9/2009 |
| KR | 10-2010-0035321 A | 4/2010 |

* cited by examiner

AUTO MOUNTING SYSTEM OF DOOR HINGE FOR VEHICLE AND METHOD THEREOF

CROSS-REFERENCE TO RELATED APPLICATION

The present application is a Divisional of U.S. patent application Ser. No. 14/494,307, filed Sep. 23, 2014, which is based on and claims the benefit of priority to Korean Patent Application No. 10-2013-0113121, filed on Sep. 24, 2013 in the Korean Intellectual Property Office, the entire contents of which applications are incorporated herein for all purposes by these references.

BACKGROUND OF THE INVENTION

Field of the Invention

The present disclosure relates to an auto mounting system of a door hinge for the vehicle and a method thereof, and more particularly, to an auto mounting system of a door hinge for the vehicle and a method thereof capable of automatically mounting door hinges for front and rear doors on side panels of the vehicle.

Description of Related Art

Generally, a door for the vehicle is mounted on a side panel by a door hinge to be openly and closely mounted on the side panel of the vehicle body.

So far, for mounting the door hinge, a worker manually mounts the door hinge on the side panel of the vehicle body by using a dedicated mounting jig in the vehicle body factory. However, reliability of door hinge mounting quality may be degraded due to the manual operation using the dedicated mounting jig.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an auto mounting system of a door hinge for the vehicle and a method thereof capable of automatically mounting door hinges for front and rear doors on side panels of the vehicle.

According to an aspect of the present disclosure, an auto mounting system of a door hinge for the vehicle includes an auto mounting apparatus of a door hinge configured to automatically mount the door hinge on a side panel of the vehicle.

The auto mounting apparatus of a door hinge may include a door hinge stacking part configured to stack the door hinge, a door hinge arranging part configured to arrange the door hinge from the door hinge stacking part, a door hinge picking part configured to pick the door hinge supplied from the door hinge arranging part, and an auto robot configured to move the door hinge picking part from which the door hinge is picked to mount the door hinge on the side panel of the vehicle.

The auto mounting system may further include a controller configured to control the auto robot.

The auto mounting system may further include a door hinge sliding part configured to be provided under the door hinge stacking part to pick the door hinge from the door hinge stacking part and slidably move the picked door hinge to the door hinge arranging part.

The door hinge picking part may include a fastening part configured to bolt the door hinge on the side panel of the vehicle.

The auto robot may include a hanger configured to be fastened with the door hinge picking part.

According to another aspect of the present disclosure, an auto mounting method of a door hinge for the vehicle includes stacking a bolted door hinge on a door hinge stacking part, slidably moving the door hinge stacked in the stacking of the door hinge to arranging the stacked door hinge in a door hinge arranging part, picking the door hinge arranged in the arranging of the door hinge by operating an auto robot, and bolting the door hinge picked in the picking of the door hinge by the auto robot to the side panel of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
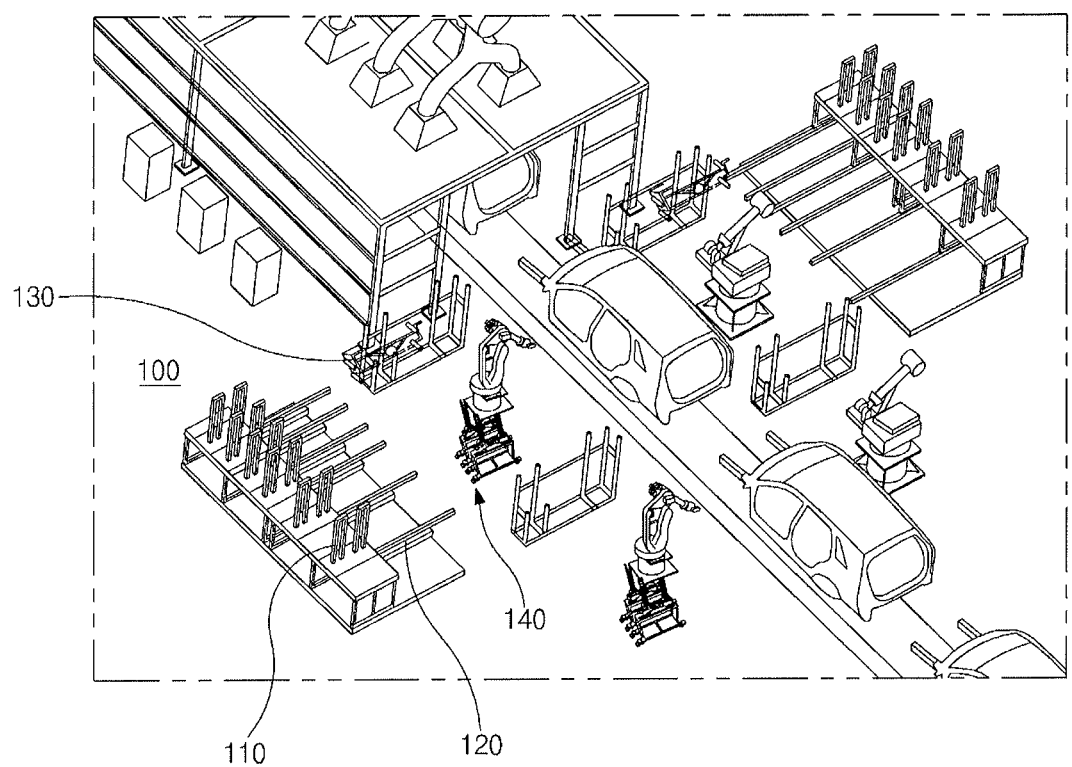
FIG. 1 and FIG. 2 are diagrams illustrating an auto mounting system of a door hinge for the vehicle according to an exemplary embodiment of the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present disclosure will be described below in detail with reference to the accompanying drawings.

As illustrated in FIG. 1, FIG. 2, FIG. 3, FIG. 4, FIG. 5, FIG. 6, FIG. 7, FIG. 8, FIG. 9, FIG. 10, FIG. 11A and FIG. 11B, an auto mounting system of a door hinge for the vehicle according to an exemplary embodiment of the present disclosure is characterized in that a door hinge 101 is automatically mounted on a side panel of the vehicle by an auto mounting apparatus 100 of a door hinge.

Figure 2:
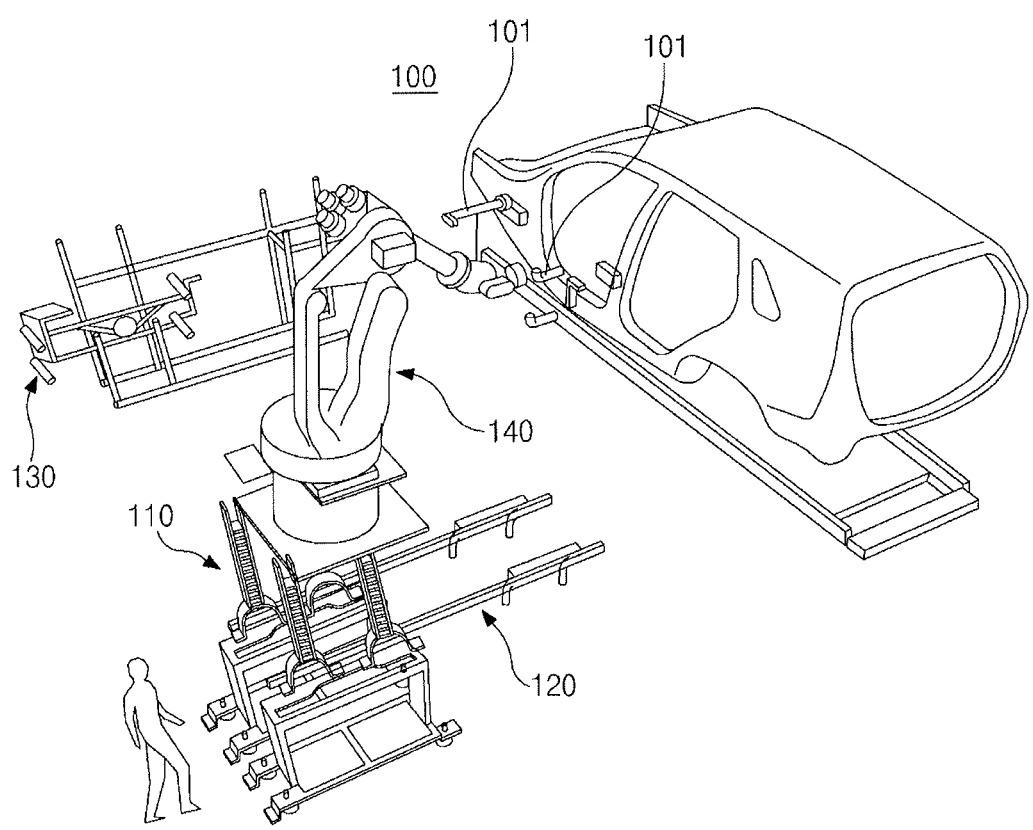

As illustrated in FIGS. 1 and 2, the auto mounting apparatus 100 of a door hinge includes a door hinge stacking part 110, a door hinge arranging part 120, a door hinge picking part 130, and an auto robot 140 as equipments for automatically mounting the door hinge 101 on the side panel of the vehicle.

Figure 3:
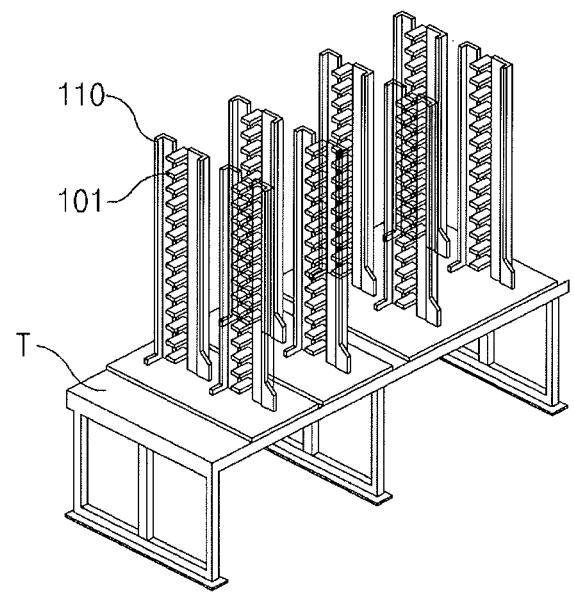
FIG. 3 is a diagram illustrating a door hinge stacking part in the auto mounting system of a door hinge for the vehicle according to an exemplary embodiment of the present disclosure.
Figure 7A:
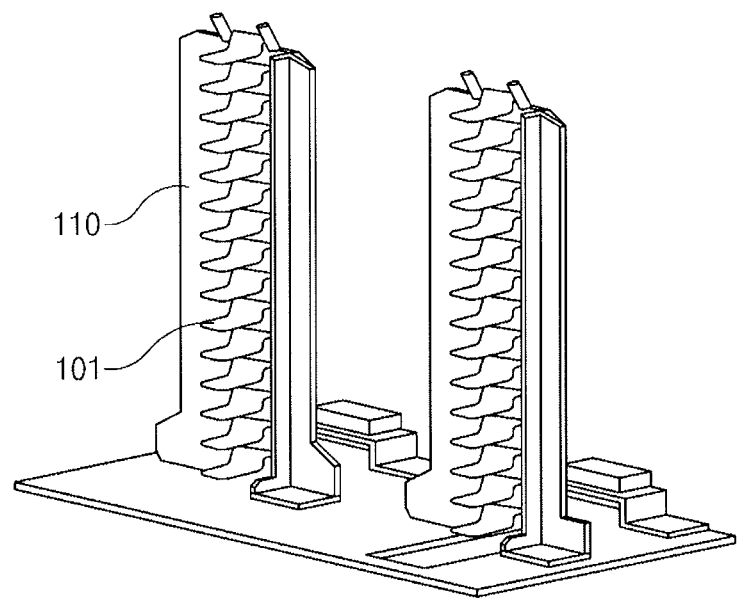
FIG. 7A and FIG. 7B are diagrams illustrating an example of the door hinge stacking part in the auto mounting system of a door hinge for the vehicle according to an exemplary embodiment of the present disclosure.
Figure 7B:
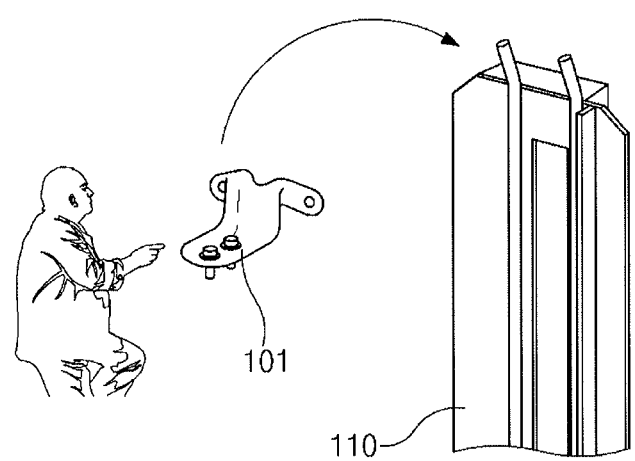

As illustrated in FIGS. 3 and 7A and 7B, the door hinge stacking part 110 is configured to stack the door hinge 101 mounted on the side panel of the vehicle and is vertically provided on a table T having a predetermined height.

As the result, the door hinge stacking part 110 may guide the door hinge 101 in an up and down direction.

In this case, the door hinge 101 is provided with bolts to be able to be mounted on the side panel by the auto robot 140 to be described below.

Meanwhile, the door hinge 101 is mounted on the side panel to open and close a door, which is a known technology, and therefore a detailed description thereof will be omitted.

Figure 4:
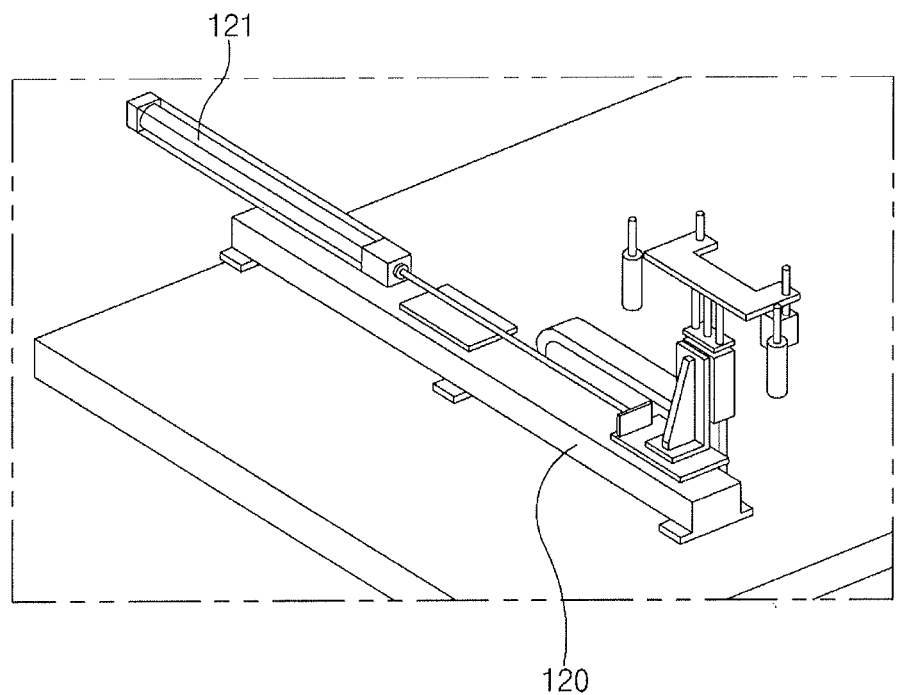
FIG. 4 is a diagram illustrating a door hinge arranging part in the auto mounting system of a door hinge for the vehicle according to an exemplary embodiment of the present disclosure.
Figure 8A:
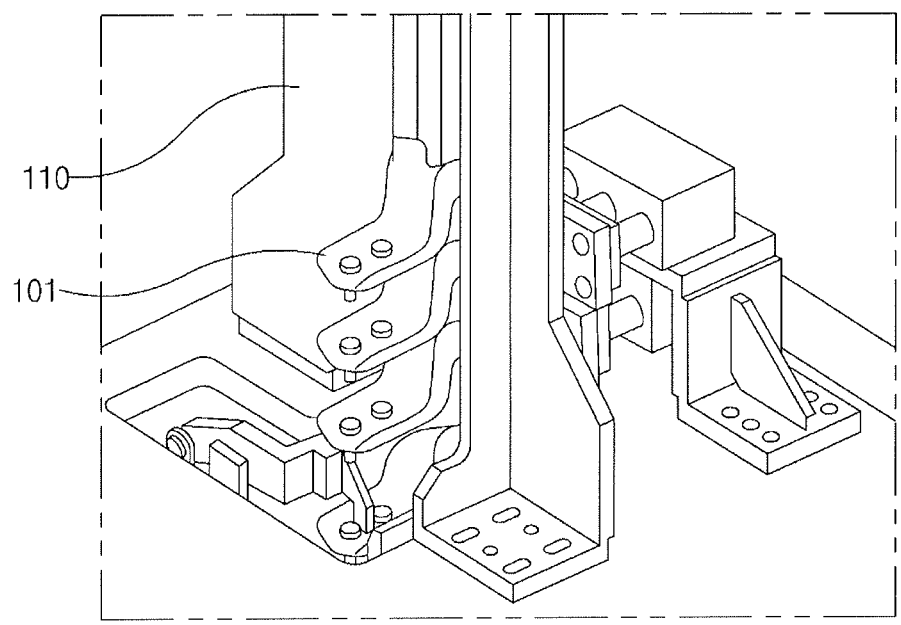
FIG. 8A and FIG. 8B are diagrams illustrating an example of the door hinge arranging part in the auto mounting system of a door hinge for the vehicle according to an exemplary embodiment of the present disclosure.
Figure 8B:
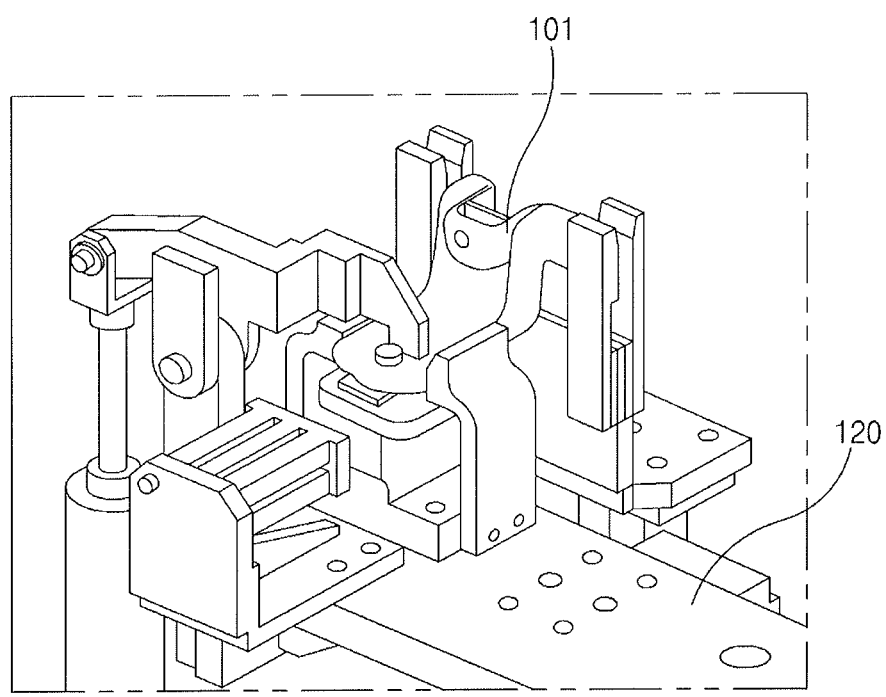

As illustrated in FIGS. 4 and 8A and 8B, the door hinge arranging part 120 arranges the door hinges 101 supplied from the door hinge stacking part 110 to be able to pick the door hinges 101 using the door hinge picking part 130 to be described below.

Here, the door hinge arranging part 120 may limit the movement of the door hinge 101 to be less than 1.0 mm.

In this case, the auto mounting system of a door hinge for the vehicle may include a door hinge sliding part 121 configured to be provided under the door hinge stacking part 110 to pick the door hinges 101 from the door hinge stacking part 110 and slidably move the picked door hinges to the door hinge arranging part 120.

That is, when the door hinges 101 are stacked on the door hinge stacking part 110, the stacked door hinges 101 are picked by the door hinge sliding part 121 and move to the door hinge arranging part 120 to be arranged.

Figure 5:
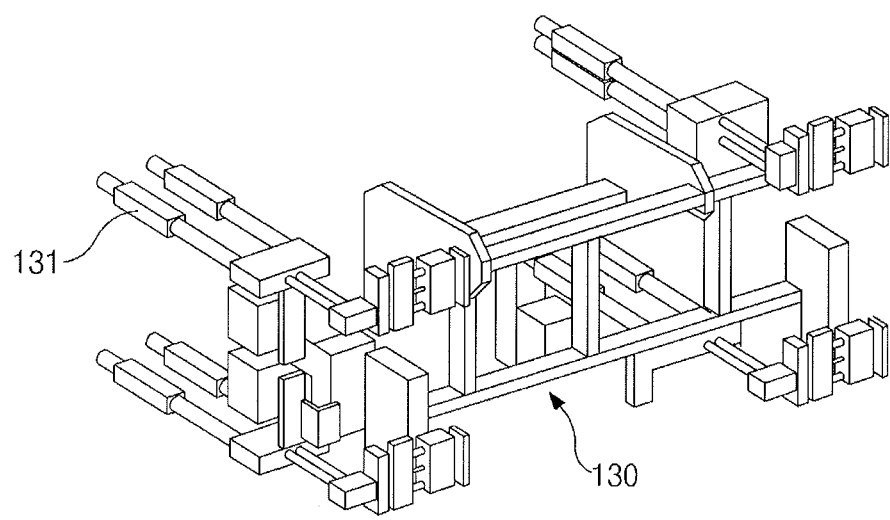
FIG. 5 is a diagram illustrating a door hinge picking part in the auto mounting system of a door hinge for the vehicle according to an exemplary embodiment of the present disclosure.
Figure 6:
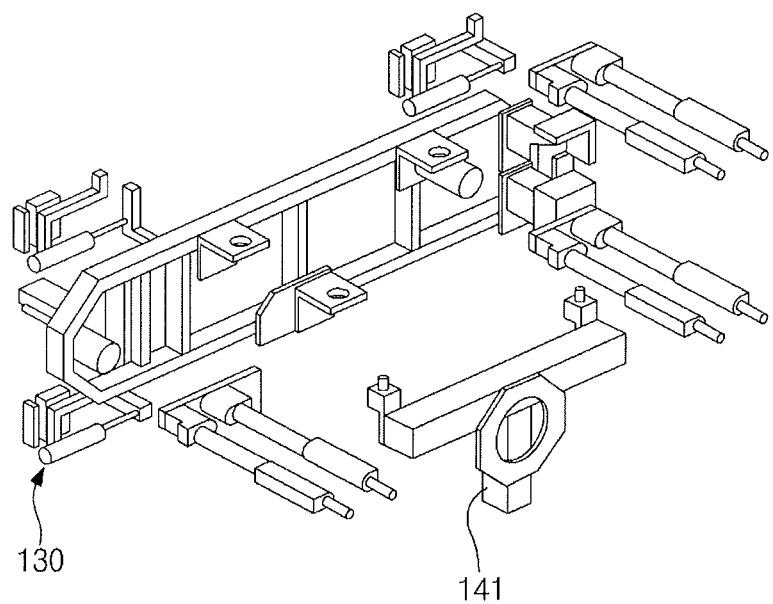
FIG. 6 is a diagram illustrating an auto robot in the auto mounting system of a door hinge for the vehicle according to an exemplary embodiment of the present disclosure.
Figure 9A:
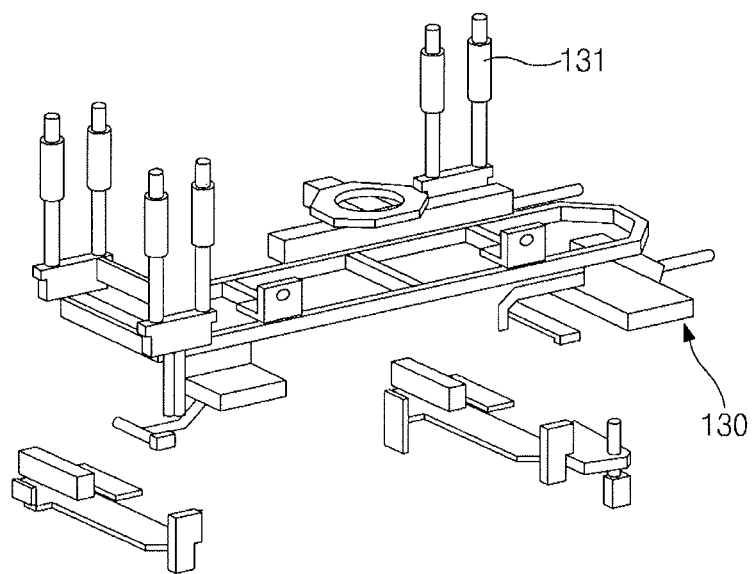
FIG. 9A, FIG. 9B and FIG. 10 are diagrams illustrating an example of the door hinge picking part in the auto mounting system of a door hinge for the vehicle according to an exemplary embodiment of the present disclosure.
Figure 9B:
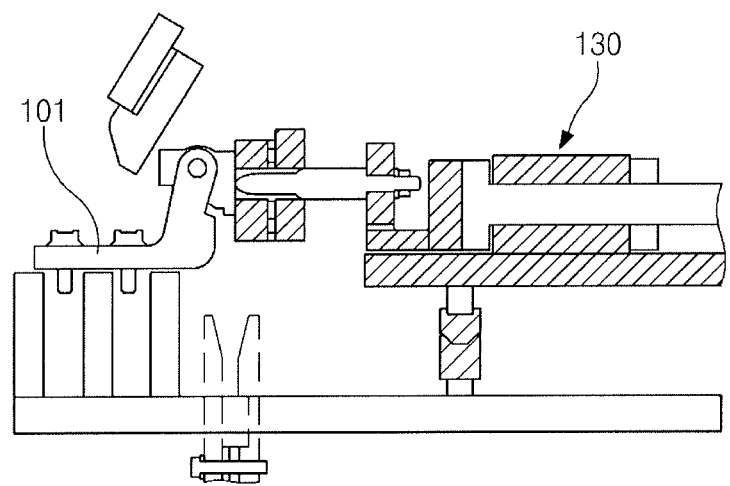

As illustrated in FIGS. 5 and 9A and 9B, when the door hinge picking part 130 picks the door hinges 101 arranged in the door hinge arranging part 120 and moves the picked door hinges to the side panels, the door hinge picking part 130 may prevent the door hinges 101 from separating and guide the door hinges 101 to mount the door hinges 101 at accurate positions at which the doors of the side panels are mounted at the time of mounting the door hinges 101 on the side panels.

Figure 10:
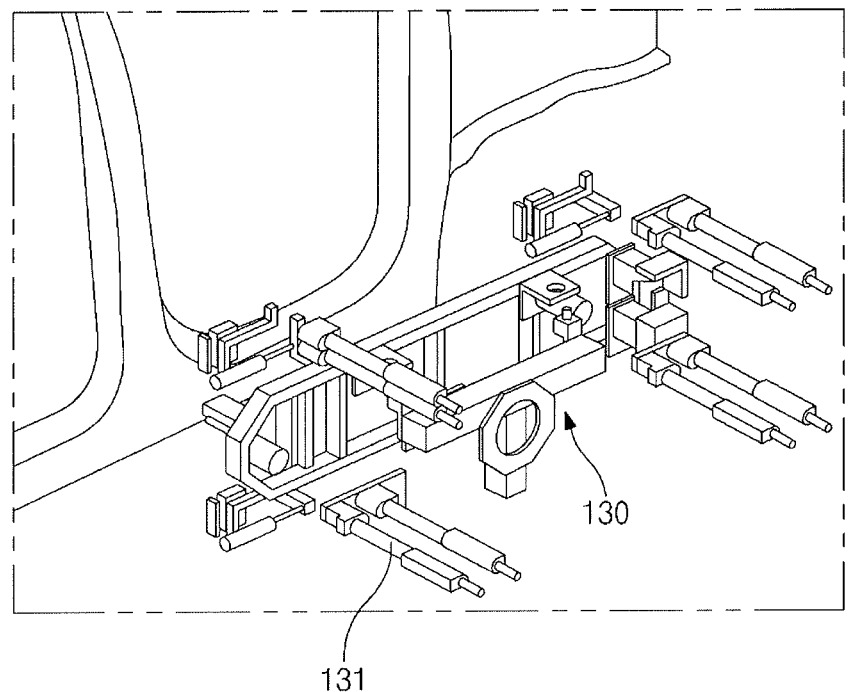
Figure 11A:
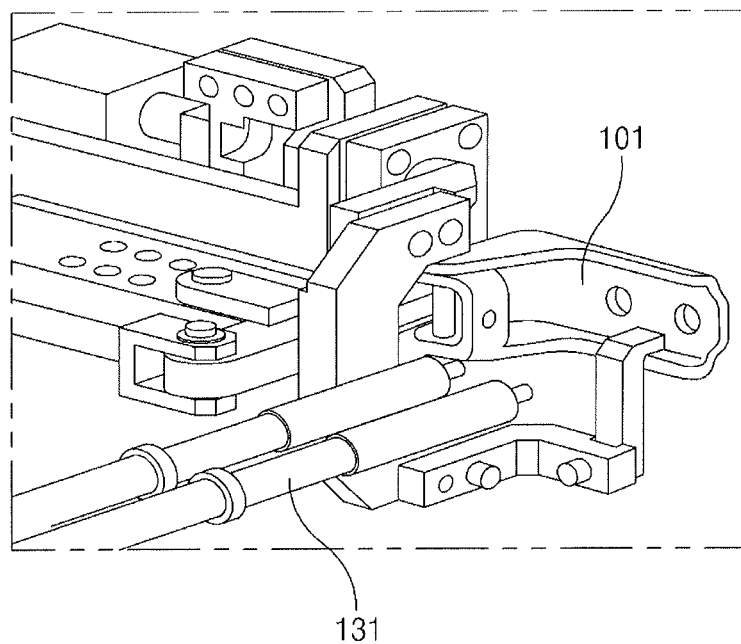
FIG. 11A and FIG. 11B are diagrams illustrating a fastening part in the auto mounting system of a door hinge for the vehicle according to an exemplary embodiment of the present disclosure.
Figure 11B:
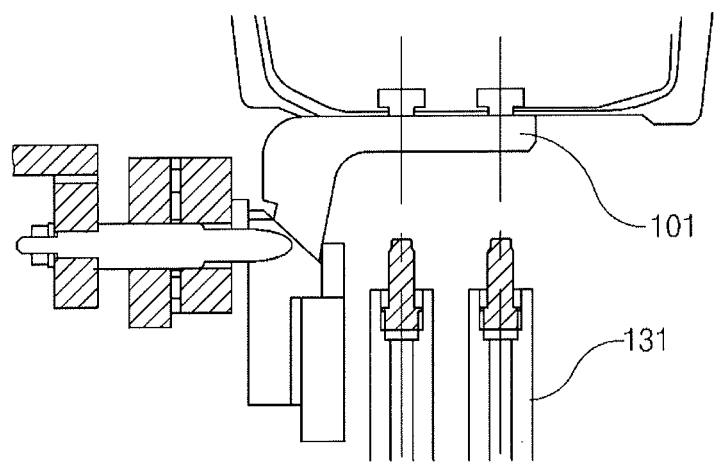
Figure 12:
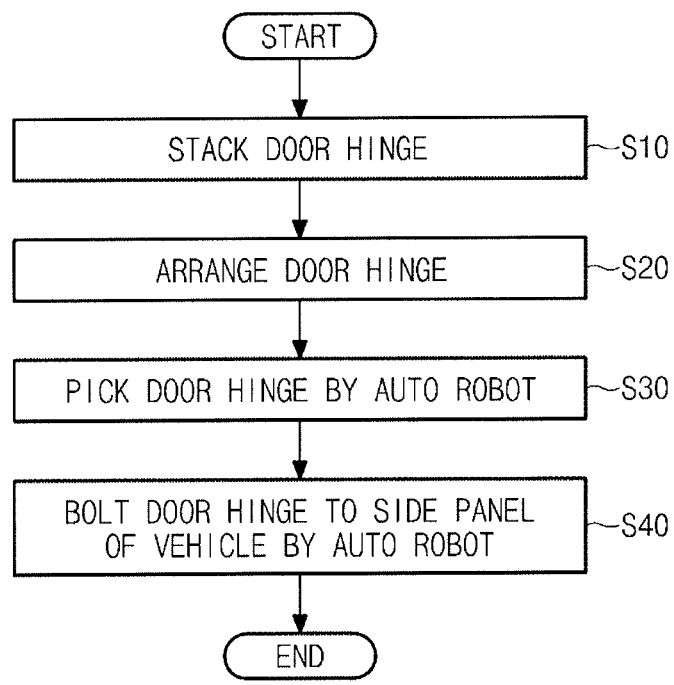
FIG. 12 is a flow chart of an auto mounting method of a door hinge for the vehicle according to an exemplary embodiment of the present disclosure.

Further, as illustrated in FIGS. 10 and 11A and 11B, the door hinge picking part 130 is provided with a fastening part 131 configured to fasten the door hinge 101 with the side panel to bolt a bolt mounted at the door hinge at the time of mounting the door hinge 101 on the side panel, thereby mounting the door hinge 101 on the side panel.

In this case, the door hinge picking part 130 and the door hinge 101 may be coupled with each other in place to improve a coupling force between the door hinge picking part 130 and the door hinge 101.

Further, a space between the door hinge picking part 130 and the door hinge 101 may be set to be less than 0.1 mm to improve the coupling force between the door hinge picking part 130 and the door hinge 101.

Meanwhile, the door hinge picking part 130 may be detached from the auto robot 140 to be described below and thus a size of the side panel is different depending on car models, such that the door hinge picking part 130 may be replaced to be applied to various kinds of car model.

Here, as illustrated in FIG. 2, the door hinges 101 picked from the door hinge picking part 130 are picked four in total by two at both ends, respectively and thus two door hinges 101 are each mounted at filler A and at filler B on the side panels of the vehicle. To this end, the door hinge stacking part 110 and the door hinge arranging part 120 are also provided in plural to arrange a pair of door hinges 101 by two.

As illustrated in FIGS. 1 and 2, the auto robot 140 moves the door hinge picking part 130 from which the door hinge 101 is picked to mount the door hinge 101 on the side panel of the vehicle.

In this case, the auto robot 140 may include a hanger 141 which is fastened with the door hinge picking part 130.

Meanwhile, the side panel of the vehicle is provided with a hole in which the door hinge 101 may be mounted.

The auto robot 140 is fastened with the door hinge picking part 130 by the hanger 141 and then rotates to pick the door hinges 101 arranged in the door hinge arranging part 120 from the door hinge picking part 130 and then rotates to the side panel of the vehicle to mount the door hinges 101 on the side panels.

In this case, the auto robot 140 may move in all directions to be able to improve the operation convenience.

Meanwhile, the exemplary embodiment of the present disclosure includes a controller, in which the controller may control an operation process of the auto robot 140 and also interwork with the door hinge arranging part 120, such that when the auto robot 140 uses the door hinge picking part 130 to pick the door hinges 101 from the door hinge arranging part 120, the door hinge sliding part 121 may pick the door hinges 101 from the door hinge stacking part 110 for the following operation.

That is, according to the exemplary embodiment of the present disclosure, when one worker stacks the door hinges 101 on the door hinge stacking part 110, the door hinge sliding part 121 picks the stacked door hinges 101 and arranges the picked door hinges in the door hinge arranging part 120 and the auto robot 140 uses the door hinge picking part 130 to pick the arranged door hinges 101 and mounts the picked door hinges on the side panels of the vehicle, such that the door hinges 101 are automatically mounted on the side panels of the vehicle with the minimum number of workers, thereby improving operation convenience, assembling quality, and an operating ratio.

As illustrated in FIG. 1, FIG. 2, FIG. 3, FIG. 4, FIG. 5, FIG. 6, FIG. 7, FIG. 8, FIG. 9, FIG. 10, FIG. 11 and FIG. 12, an auto mounting method of a door hinge for the vehicle according to an exemplary embodiment of the present disclosure includes stacking the door hinges 101 S10, picking the stacked door hinges 101 and moving and arranging the picked door hinges 101 S20, picking the arranged door hinges 101 S30, and bolting the picked door hinges 101 on the side panels S40.

In the stacking of the door hinges S10, a worker stacks the bolted door hinges 101 on the door hinge stacking part 110, which is only manual operation performed by the worker among the operations of the auto mounting method of the door hinge 101 for the vehicle according to the exemplary embodiment of the present invention.

In the arranging of the door hinges S20, the door hinges 101 stacked in the stacking of the door hinges S10 are picked through the door hinge sliding part 121 and then slidably move and thus are arranged in the door hinge arranging part 120.

Further, in the arranging of the door hinges S20, the door hinge 101 may slidably move through the door hinge sliding part 121.

In this case, in the stacking of the door hinges S10, when the door hinge 101 moves to the arranging of the door hinges S20, the door hinge 101 stacked in the door hinge stacking part 110 may automatically move downwardly.

Meanwhile, in the stacking of the door hinges S10, the door hinge 101 may include a bolt.

In the picking of the door hinges S30, the door hinges 101 arranged in the arranging of the door hinges S20 are picked by the auto robot 140.

In this case, in the picking of the door hinges S30, the detachably provided door hinge picking part 130 may be replaced and thus a size of the side panel is different depending on car models, such that the door hinge picking part 130 may be replaced to be applied to various car models.

In the bolting of the door hinge S40, the door hinges 101 picked in the picking of the door hinges S30 by the auto robot 140 are bolted to the side panels of the vehicle.

In this case, in the bolting of the door hinges S40, the side panel of the vehicle may be provided with the hole to bolt the door hinge 101.

Meanwhile, the auto mounting method of a door hinge for the vehicle according to the exemplary embodiment of the present disclosure is operated by the controller, in which the controller may control the operation process of the auto robot 140 and when the auto robot 140 may pick the door hinges 101 from the door hinge arranging part 120, may make the door hinge sliding part 121 pick the door hinges 101 from the door hinge stacking part 110 for the following operation.

That is, according to the exemplary embodiment of the present disclosure, when one worker stacks the door hinges 101 on the door hinge stacking part 110 in the stacking of the door hinges S10, the door hinge sliding part 121 picks the stacked door hinges 101 and arranges the picked door hinges 101 in the door hinge arranging part 120 in the arranging of the door hinges S20 and the auto robot 140 picks the arranged door hinges 101 in the picking of the door hinges S30 and mounts the picked door hinges 101 on the side panels of the vehicle through the bolting of the door hinges S40, such that the door hinges 101 are automatically mounted on the side panels of the vehicle with the minimum number of workers, thereby improving the operation convenience, the assembling quality, and the operating ratio.

As described above, according to the exemplary embodiments of the present disclosure, it is possible to improve the operation convenience due to the minimization of the number of workers, the assembling quality, and the operating ratio, by automatically mounting the door hinges for the front and rear doors on the side panels of the vehicle.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An auto mounting method of door hinges for a vehicle, the auto mounting method comprising:
   selecting, by an auto robot, one of a plurality of door hinge picking parts, each of which is configured to pick one of different kinds of the door hinges;
   picking, by the one of the plurality of the door hinge picking parts, the one of different kinds of the door hinges arranged to correspond to the one of the plurality of the door hinge picking parts;
   moving, by the auto robot, the one of the plurality of the door hinge picking parts to a side panel of the vehicle; and
   bolting, by the one of the plurality of the door hinge picking parts, the door hinge picked in the one of the plurality of the door hinge picking parts to the side panel of the vehicle,
   wherein each of the plurality of the door hinge picking parts includes:
     a frame configured to be detachably connected to the auto robot; and
     a pin disposed at the frame and configured to pick the one of different kinds of the door hinges.

2. The auto mounting method according to claim 1, wherein the door hinge includes a bolt.

* * * * *